United States Patent [19]
Forker et al.

[11] Patent Number: 4,630,909

[45] Date of Patent: Dec. 23, 1986

[54] APPARATUS FOR MEASURING THE POSITION OF A LIGHT SOURCE DISPOSED INSIDE A LIGHTHOUSE

[75] Inventors: Dieter Forker, Altbach; Joachim Hassler, Esslingen; Bernhard Lau, Aichwald; Rolf Schmidt, Esslingen, all of Fed. Rep. of Germany

[73] Assignee: Standard Elektrik Lorenz AG, Stuttgart, Fed. Rep. of Germany

[21] Appl. No.: 701,415

[22] Filed: Feb. 14, 1985

[30] Foreign Application Priority Data

Feb. 15, 1984 [DE] Fed. Rep. of Germany ....... 3405306

[51] Int. Cl.$^4$ .................... G03B 41/00; G03B 11/26
[52] U.S. Cl. .................................. 354/1; 356/121; 356/141; 356/152
[58] Field of Search ............... 354/1; 356/6, 121, 141, 356/152; 430/23

[56] References Cited

U.S. PATENT DOCUMENTS 3,482,495 12/1969 Jameikis .................................. 354/1

Primary Examiner—William B. Perkey
Attorney, Agent, or Firm—Donald J. Lenkszus

[57] ABSTRACT

Measuring apparatus for measuring the position of a light source inside a lighthouse as used in the manufacture of phosphor screens of color picture tubes comprises a base plate and two optical projection devices which are directed on to the light source, and which each contain at least two position diodes. An evaluating circuit connected thereto ascertains the position of the light source and the result is fed to a display device.

6 Claims, 4 Drawing Figures

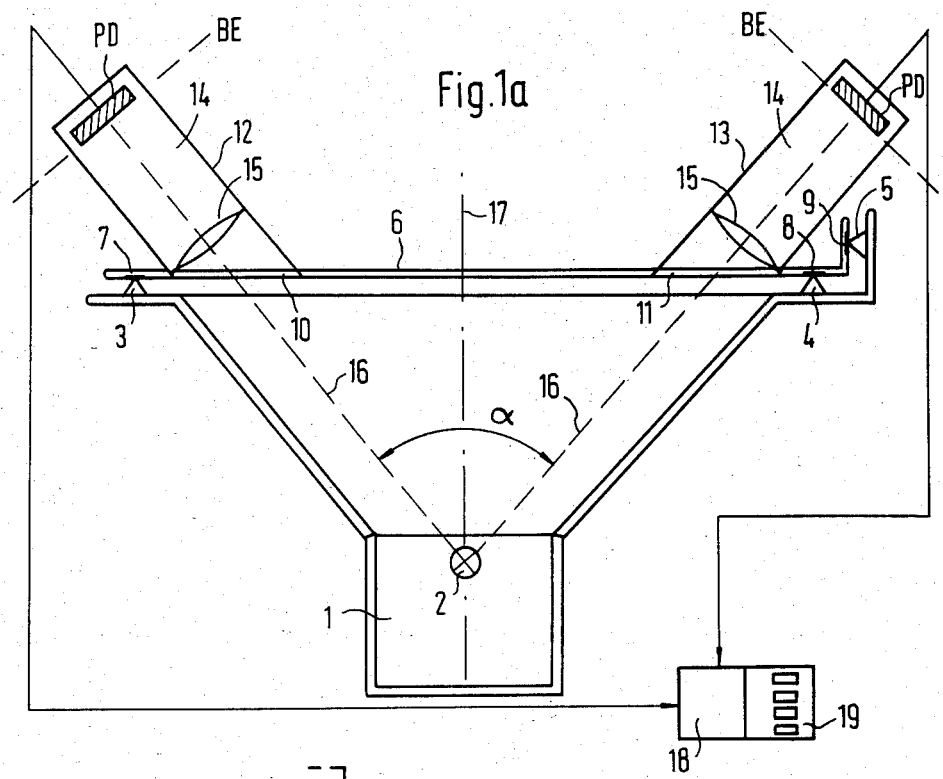
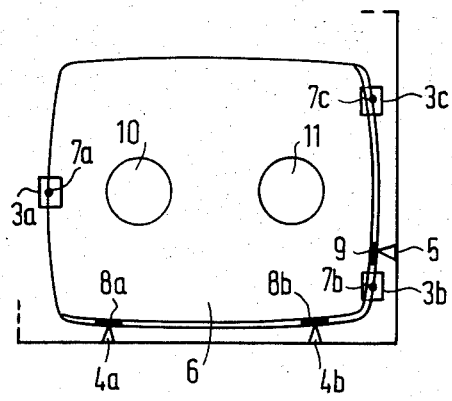
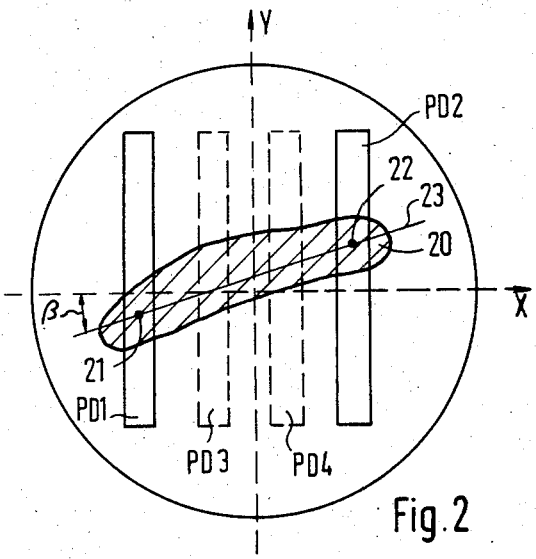

APPARATUS FOR MEASURING THE POSITION OF A LIGHT SOURCE DISPOSED INSIDE A LIGHTHOUSE

BACKGROUND OF THE INVENTION

The invention relates to apparatus for measuring the position of an elongated light source inside a lighthouse used in the manufacture of luminiscent or phosphor screens of color picture tubes.

U.S. Pat. No. 3,482,495 shows apparatus for measuring the position of an exposure lamp inside a lighthouse. Lighthouses are used to expose the phosphor layer from which the screens of color picture tubes are made. The conventional lighthouse comprises a point-shaped light source with a collimator disposed thereabove. The measuring (alignment) apparatus comprises a base plate provided with stop faces (position stops) with the aid of which it is brought into alignment with a lighthouse when placed thereon. The base plate has mounted thereunder eight optical projection devices (light transmitting systems) each comprising two adjustable mirrors and one biconvex lens which image the exposure lamp on a screen disposed in the center of the base plate. The screen is subdivided into nine squares of which the outer eight ones have cross shaped targets which are illuminated by eight optical projection (light transmitting) systems. For calibration, the measuring (alignment) apparatus is placed onto a standard lighthouse. Thereafter, the eight optical projection (light transmitting) systems are adjusted in such a way that the eight squares are illuminated in their centers. Thereafter, the thus calibrated alignment apparatus is placed onto a production lighthouse, with the exposure lamp and the position stops thereof being so adjusted that again the eight squares are illuminated in their centers.

SUMMARY OF THE INVENTION

It is one object of the invention to provide a simple apparatus for measuring the position of elongated light sources in lighthouses, which supplies measured values corresponding to the position.

With the aid of the novel apparatus in accordance with the invention it is possible to directly measure the position of exposure lamps in lighthouses within a measuring time of less than one minute. The display device directly indicates the direction and amount of correction. The measuring accuracy with respect to the position of the light source in the exposure lamp amounts to about $\pm 5$ $\mu$m and the angle deviating from the ideal position can be determined to somewhat better than $+0.02°$.

BRIEF DESCRIPTION OF THE DRAWING

The invention will be better understood from a reading of the following detailed description in conjunction with the drawings in which:

FIG. 1a schematically shows the longitudinal section taken through a lighthouse with the measuring (alignment) apparatus placed thereon;

FIG. 1b is the top view onto the lighthouse as shown in FIG. 1a;

FIG. 2 is the top view onto the position diodes with the light source of the of the exposure lamp imaged thereon.

DETAILED DESCRIPTION

Figure 3:
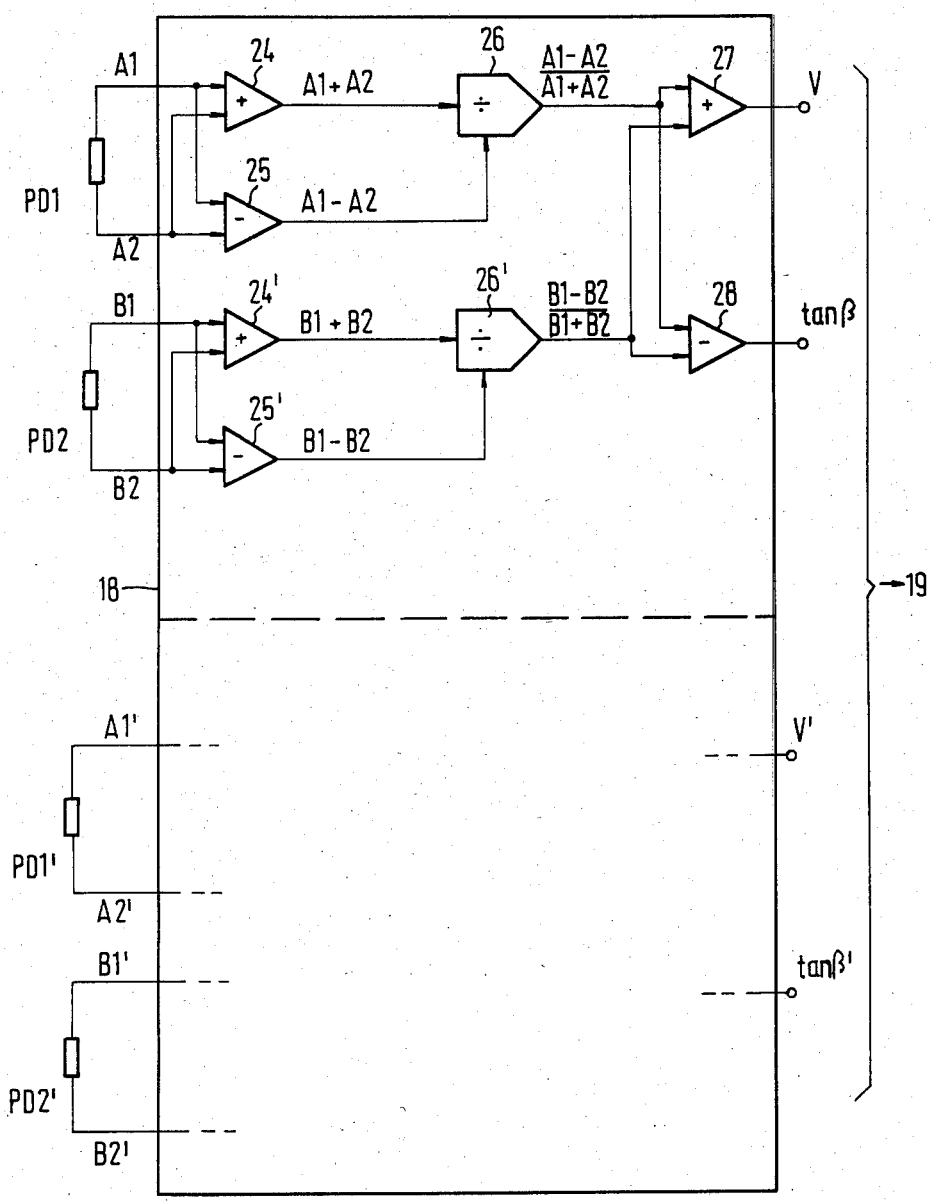
FIG. 3 is a block diagram of the evaluating circuit.

FIG. 1a is the simplified longitudinal section taken through a lighthouse for exposing the phosphor layer on the face plate of a color picture tube. In light box 1, light source 2 has an elongated body extending vertically in relation to the drawing plane. The exposure lamp forming part of the light-emitting body or the light source is not shown in greater detail. Usually, a maximum high-pressure mercury lamp producing ultraviolet light is used as the exposure lamp. The exposure lamp is mounted in a fixture not shown which permits an adjustment of the exposure lamp. Not shown in the drawings is how the voltage is supplied and how the exposure lamp is cooled. At its upper conical part, the lighthouse is provided with a rim portion on which six position stops 3a, 3b, 3c, 4a, 4b and 5 are provided. During the production, the face place and aperture-mask unit of a color picture tube is placed onto the position stops 3a, 3b and 3c for exposure. For measuring the position of the light source, the base plate 6 of the measuring apparatus is likewise placed onto position stops 3a, 3b and 3c and pushed against the lateral position stops 4a, 4b and 5. The axis of the lighthouse extending vertically in relation to the longitudinal axis of and through the light source 2, is indicated by the reference numeral 17. All further parts which usually belong to a lighthouse, have been omitted for the sake of clarity.

The base plate 6 of the measuring apparatus has six stop faces 7a, 7b, 7c, 8a, 8b, and 9, with the aid of which the bar plate 6 can be brought into alignment on the lighthouse. The base plate 6 further has two openings 10 and 11. One optical projection device 12, 13 is disposed above each of the two openings 10 and 11. Each of these optical projection devices 12 or 13 consists of a tube 14 and a lens 15. At the end of each tube 14, the position diodes PD are disposed in the image plane BE. The position diodes may be, for example, the commercially available types of dual-axis position-sensing detectors manufactured by United Detector Technology, Inc., Santa Monica, CA. The optical projection devices produce an image of the light source in the image plane BE. The optical projection devices are in a plane which is approximately vertical in relation to the longitudinal axis of the light source, and are so inclined that their axes 16 form an angle a ranging between 45° and 135°. As explained in greater detail hereinafter, the position diodes PD are connected to an evaluating circuit 18 with a subsequently arranged display device 19.

FIG. 1b particularly illustrates the location of the position stops 3, 4 and 5, of the stop faces, 7, 8, 9 and the shape of the base plate 6.

FIG. 2 is the top view onto the position diodes PD inside the tube 14 of the optical projection device 12. On the position diodes PD1 and PD2 there is drawn the image 20 of the light source which is projected, for example, when employing the measuring apparatus. A coordinate system is drawn over the position diodes. The X axis extends rectangularly in relation to the longer axis of the position diodes PD1 and PD2, and the Y axis extends parallel in relation thereto. The optical projection devices are disposed on the base plate 6 such that the image 20 of the light source, when the latter is in its ideal position, coincides with the X axis.

The electric signals produced by the position diodes PD upon illumination, permit the direct determination of the luminous density centers of partial areas of the light source. In FIG. 2, these luminous density centers are indicated by the reference numerals 21 and 22, and it can be seen that the light source is not in its ideal position. The deviation consists of a displacement of the Y axis which is evident at the point of intersection, shifted from the origin of coordinates, of the connecting line 23 of the luminous density centers 21 and 22, with the Y axis. The deviation also consists of a twist of the connecting line 23 about the angle B. The angle B is formed by the connecting line 23 and the X axis. The amount of deviation can be easily calculated by combining the signals of at least two position diodes PD. For checking the straightness of the light source, two further position diodes PD3 and PD4 indicated by dashlines in FIG. 2 are required.

FIG. 3 is a block diagram of the evaluating circuit 18, to which the position diodes PD1 and PD2 of the optical projection device 12, and the position diodes PD1' and PD2' of the optical projection device 13 are connected. Because the evaluating circuit 18 for combining the signals of the position diodes PD1 and PD2 and of the position diodes PD1' and PD2', is of the same design, this circuit is only shown once.

The signals produced by the position diode PD1 are indicated as A1 and A2, and the signals produced by the position diode PD2 are indicated as B1 and B2. The sum of the signals A1 and A2 corresponds to the intensity, and the difference of the signals A1 and A2 corresponds to the position of the luminous density center on the position diode PD1. The quotient of sum and difference is the normalized position signal which is independent of the intensity and can be calibrated in millimeters. The sum of the two normalized position signals of the position diodes PD1 and PD2 serves as a measure for the parallel displacement, and the difference between both position signals serves as a measure for the tangent of the angle B of the light source.

Signals A1 and A2 are coupled to operational amplifiers 24 and 25. Signals B1 and B2 are coupled to operational amplifiers 24' and 25'. Operational amplifiers 24 and 24' are connected as summation amplifiers and amplifiers 25 and 25' are connected as difference amplifiers. The summation signals A1 and A2 of amplifier 24 and the difference signals A1−A2 of amplifier 25 are coupled to analog circuit 26 which forms the quotient signal (A1−A2)/(A1+A2).

Similarly, the summation signals B1+B2 of amplifier 24' and the difference signals B1−B2 of amplifier 25' are coupled to the analog circuit 26' which forms the quotient signal (B1−B2)/(B1+B2).

The quotient signals are in turn coupled to the inputs of summation operational amplifier 27 and difference operational amplifier 18 to respectively produce the sum which indicates the displacement V and the difference which indicates tan B.

The display device 19 which may be of conventional design displays the signals V and V', for example, digitally. Relative thereto, the amplification of the evaluating circuit 18, for example, may be adjusted such that ±10 V at the output of the operational amplifier 27 corresponds to ±2.5 mm. The signals tan B and tan B' are likewise represented by way of digital display. In this case, the amplification of the evaluating circuit 18 may be adjusted such that ±10 V at the output of the operational amplifier 28 corresponds to ±20°. With the aid of such a setup of the measuring apparatus there has been obtained a resolution of ±5 μm during displacement, and of ±0.02° in the angle.

What is claimed is:

1. Apparatus for measuring a position of an elongated light source in a lighthouse used in the manufacture of luminescent screens of color picture tubes, comprising:
   a base plate capable of being placed onto the lighthouse in place of a face-plate and aperture-mask unit;
   first and second optical projection devices carried on said base plate, each projecting an image of said light source on first and second imaging planes, respectively;
   at least two first position diodes disposed in said first imaging plane;
   at least two second position diodes disposed in said second imaging plane; and
   an evaluating circuit coupled to said first and second position diodes.

2. Apparatus in accordance with claim 1, wherein:
   said first and second projection devices have first and second optical axes directed onto said light source, respectively; and
   said first and second optical axes form an angle ranging between 45° and 135°.

3. Apparatus in accordance with claim 1, wherein:
   each of said first and second position diodes is longer than it is wide and each said first and second position diode is disposed in said first and second imaging plane, respectively, such that its longer dimension is substantially perpendicular to the longer dimension of said image of said elongated light source.

4. Apparatus in accordance with claim 1, wherein:
   said evaluating circuit is an analog computing circuit.

5. Apparatus in accordance with claim 4, comprising a display device responsive to signals produced by said evaluating circuit.

6. Apparatus in accordance with claim 1, wherein:
   said first and second optical projection devices each contain four first and second position diodes, respectively.

* * * * *